US006945660B2

(12) United States Patent
Arcos Gomar et al.

(10) Patent No.: US 6,945,660 B2
(45) Date of Patent: Sep. 20, 2005

(54) DEVICE FOR CAPTURING AND EMITTING RADIATIONS

(76) Inventors: Benjamin F. Arcos Gomar, Av. Brillante #62, Col. Pedregal de Atizapan, Atizapan de Zaragoza Edo. (MX), 58942; Tupac Arcos Castro, Av. Brillante #62, Col. Pedregal de Atizapan, Atizapan de Zaragoza Edo. (MX), 58942

( * ) Notice: Subject to any disclaimer, the term of this patent is extended or adjusted under 35 U.S.C. 154(b) by 0 days.

(21) Appl. No.: 10/250,984

(22) PCT Filed: Nov. 1, 2001

(86) PCT No.: PCT/MX01/00084

§ 371 (c)(1),
(2), (4) Date: Jul. 10, 2003

(87) PCT Pub. No.: WO02/055943

PCT Pub. Date: Jul. 18, 2002

(65) Prior Publication Data

US 2004/0065319 A1 Apr. 8, 2004

(30) Foreign Application Priority Data

Jan. 11, 2001 (MX) .................................... 2001/000376

(51) Int. Cl.[7] .............................. G02B 5/10; F21J 2/10
(52) U.S. Cl. ........................ 359/852; 359/853; 359/867
(58) Field of Search ................................ 359/851, 852, 359/853, 867; 126/684, 692, 693, 694

(56) References Cited

U.S. PATENT DOCUMENTS

| | | | | | |
|---|---|---|---|---|---|
| 3,285,333 | A | * | 11/1966 | Johnson, Jr. | 165/133 |
| 4,116,540 | A | * | 9/1978 | Thomas | 359/869 |
| 4,148,297 | A | * | 4/1979 | Sherman, Jr. | 126/685 |
| 4,287,880 | A | * | 9/1981 | Geppert | 126/685 |
| 4,311,132 | A | * | 1/1982 | van Kuijk | 126/655 |
| 4,459,972 | A | * | 7/1984 | Moore | 126/600 |
| 4,538,886 | A | * | 9/1985 | Townsend et al. | 136/246 |
| 4,610,518 | A | * | 9/1986 | Clegg | 359/868 |
| 5,540,216 | A | * | 7/1996 | Rasmusson | 126/683 |
| 5,971,551 | A | * | 10/1999 | Winston et al. | 359/868 |

FOREIGN PATENT DOCUMENTS

| | | | |
|---|---|---|---|
| GB | 1581253 | * | 12/1980 |
| RU | 2154777 C1 | * | 8/2000 |

* cited by examiner

*Primary Examiner*—John Juba, Jr.
(74) *Attorney, Agent, or Firm*—Maria Erlinda Co Sarno

(57) ABSTRACT

The disclosure is a radiation collecting/emitting device to/from different spatial directions, the apparatus in the preferred design is manufactured in a single piece and the work surface is modified to obtain a reflective surface for the radiations of interest. In an alternate design, the device is covered by an envelope or bell to increase the effectiveness of the device and protect it from the surrounding environment. The device can be used in a wide variety of applications, such as solar energy collection for industrial or commercial purposes, diverse electromagnetic radiations antennae or radar, since its area of action is 360° related to the horizontal and 180° related to the vertical.

17 Claims, 14 Drawing Sheets

DEVICE FOR CAPTURING AND EMITTING RADIATIONS

ANTECEDENTS AND FIELD OF INVENTION

This invention is related to sunlight collection apparatuses specifically, the apparatus is a device that has been designed and set up to be able to collect and emit different types of radiations. The device is a a radiation collector/emitter device, comprising: a stationary toroidal work surface, having a rotation axis and including a polished concave semicircular or parabolic reflecting surface being generated by rotating a generatrix a full 360 degrees about said rotation axis on a horizontal plane. The generatrix having an inclined axis and being one of a semicircular arc centered about said inclined axis or a parabolic arc having parabolic arc sections on both sides of said inclined axis, the inclined axis being diagonally outward of the rotation axis and oriented approximately 45 degrees with respect to the horizontal plane, the reflecting surface collecting radiation from a source and concentrating the reflected radiations in a focal perimetrical line inside a curvature radius defined by the concave reflecting surface the distance of the perimetrical line from the reflecting surface dependent upon the concavity and orientation or inclination of the reflecting work surface.

The use of energy sources other than hydrocarbons has been a concern for many researchers. Among these sources are aeolic, geothermal, solar, etc. Within the field of use of solar energy, a number of inventions such as the heliostat of U.S. Pat. No. 4,459,972 have been developed to collect and take advantage of the widespread source of energy represented by solar energy.

Among the most common devices are those that absorb solar energy through solar cells that transform this energy into electrical power, which is then transformed according to the intended use.

It is also known that there are devices for the use of solar energy that concentrate it to heat a given object, such as water or some container, for its later use.

An important disadvantage of these systems is the fact that its efficiency depends greatly upon the orientation of the collection devices, which, for its optimum use, must be oriented in relation to the sun, in such a way to collect the most brightness or radiation, consequently, most of these collection devices must have motors or some other means to achieve flexibility in orientation, according to the hour of the day and the season of the year.

The radio wave, television, etc. collection devices are usually semispherical devices, specifically parabolas or common antennae, which pick-up a certain amount of radiations and concentrate them in a focal point, there they are collected by a collecting element for its later use.

Devices such as radars operate under a similar principle, where radiations are emitted towards one or several points in space, either within or outside the earth's atmosphere.

Frequently, both collection and emission devices described above, use motors or devices to pick-up or emit radiations of interest in an optimum form.

U.S. Pat. No. 4,602,613 describes a solar energy collection device made up of two collectors, one primary, stationary and fixed, cylindrically arched, and a mobile secondary collector, which is a flat plaque that moves in horizontal direction.

U.S. Pat. Nos. 4,230,095; 4,359,265; 4,387,961 and 5,289,356 of Winston, offer a number of devices, but all of them are based on a concentrator based on a single optically parabolic system, as a primary solar energy concentrator.

U.S. Pat. No. 5,564,410 describes an improved concentration system for solar energy, in which two fixed reflecting elements are placed one in front of the other, and with a common mobile collecting element with the purpose of following the focus of both reflecting elements, these elements are concave and are oriented in a fixed horizontal way.

Construction, even if it is relatively simple, implies reflective elements and the concentrator, in addition to a microprocessor-based system to move this collector.

Thus, it would be desirable to have a device which could emit or collect radiations without the need of motors or orientation devices that search for the concentration focus of energy, in case of collectors, or that spin while emitting radiations, in case of radiation emission devices.

This invention provides a simple set up device which solves the problems in technique's state by providing a device that does not require modification in its position to collect as well as emit radiations in an optimum way.

PURPOSES OF THE INVENTION

It is therefore an object of this invention to provide a stationary device that can collect energy in the form of radiation regardless of the position and movement of the energy source.

It is also an object of this invention to provide a device that collect radiations from radiation sources other than the sun, these sources may be man-made or not.

It is also a further object of this invention to provide a device that emit radiations towards different directions in space at the same time as it collects radiation with a maximum efficiency.

In this description the terms collector and pick-up are used indistinctly to designate the element used to reflect and concentrate radiations in a determined point or zone.

DESCRIPTIONS OF THE PREFERRED DESIGNS

The following is a detailed description of this invention, using the figures described above and a preferred design of the collector/emitter device subject of this invention, used as a solar energy collector, with the only purpose of a better understanding of the invention.

It must be understood that the device in this invention can be used both to collect solar energy and radio waves and any kind of radiations, by performing the necessary modifications to the work surface and the auxiliary devices which will collect those radiations. Similarly, the apparatus in this invention can be equally adapted, through modifications in the work surface, to emit radiations of different nature, by performing changes in the devices attached to same.

Figure 1:
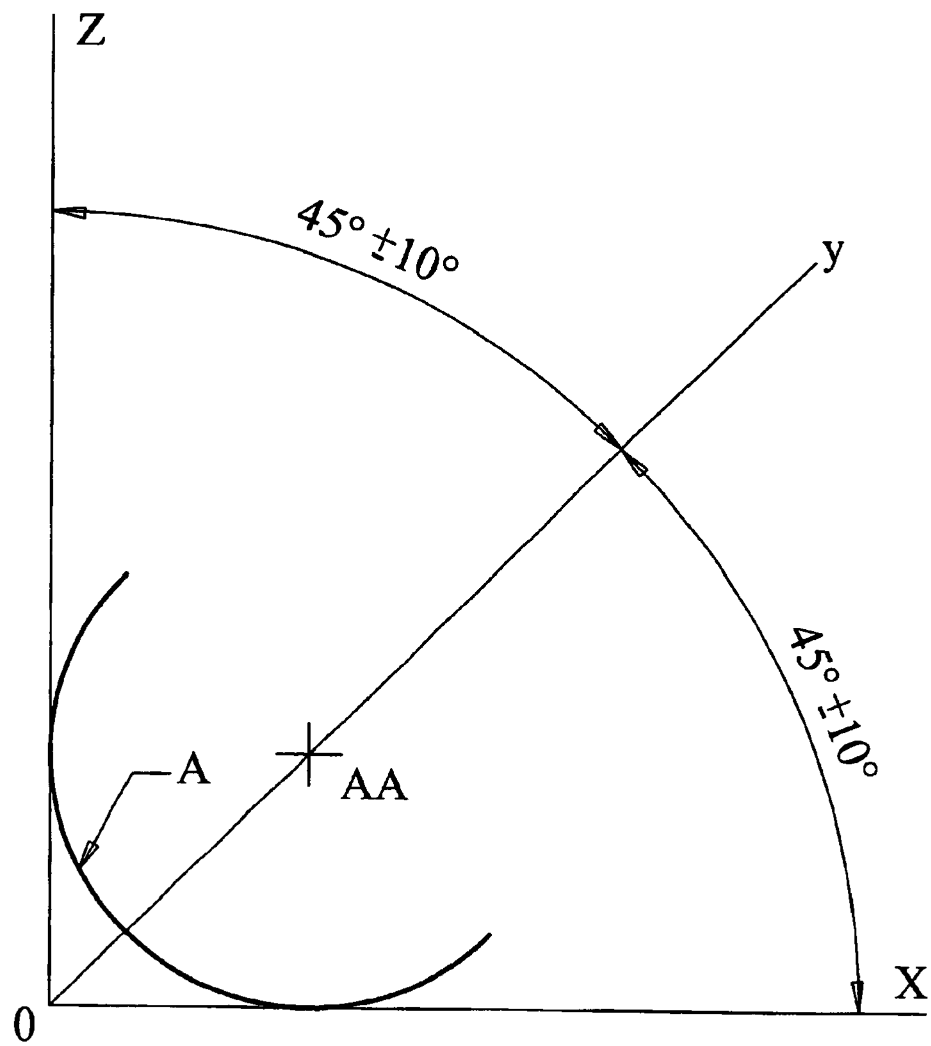
FIG. 1 shows a segment of a circle or parabola, generatrix (A), oriented on the Y axis with a focal concentration point AA.
Figure 2:
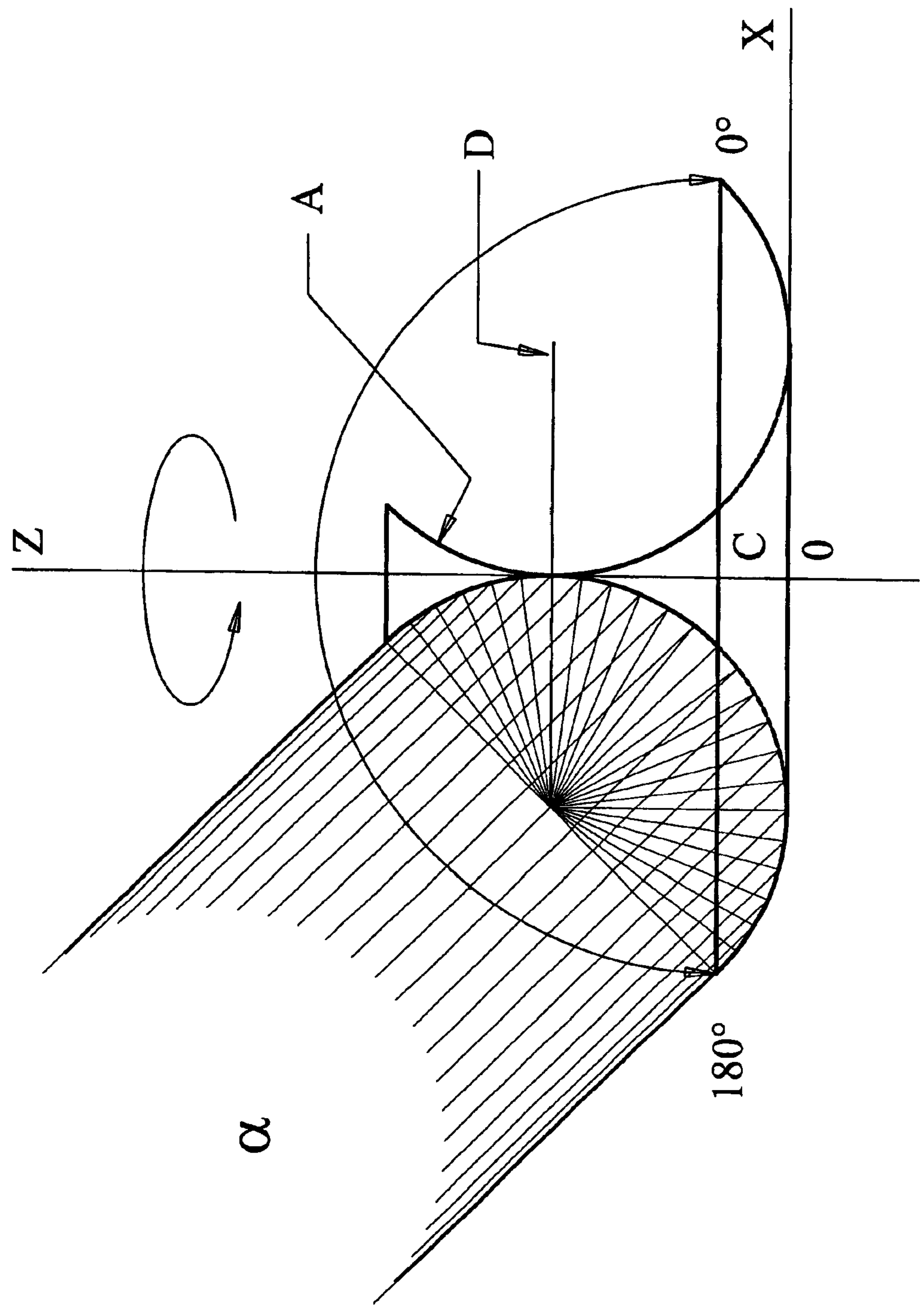
FIG. 2 shows the work surface C of the collection/emission device of this invention formed by revolving the generatrix (A) shown in FIG. 1, 360° in a horizontal plane around the z-axis, the work surface C collecting an incidence of solar radiation, in this illustration, and emitting a perimetrical focal line D.
Figure 4:
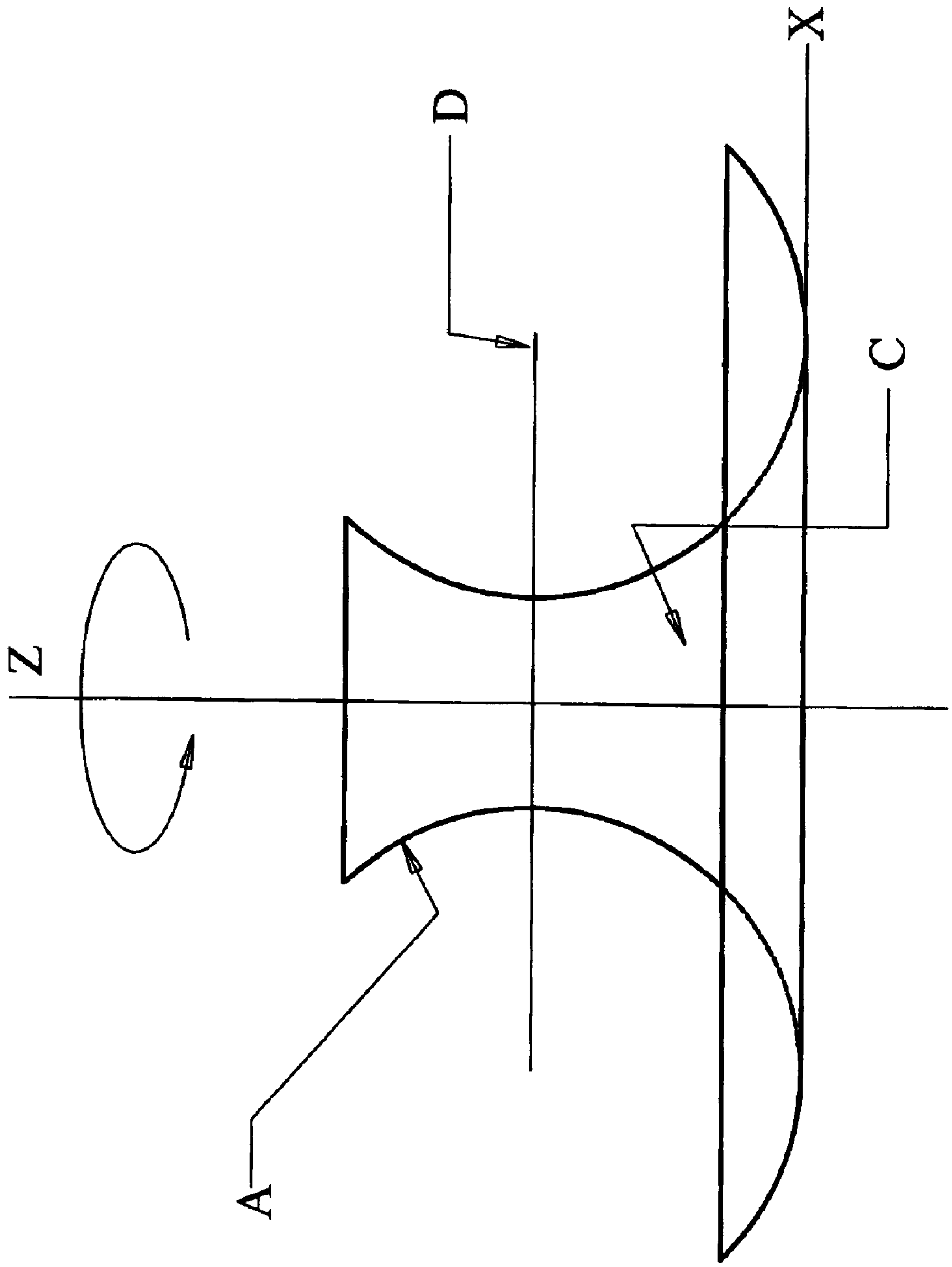
FIG. 4 is a side plan view of the collector/emitter of this invention.
Figure 4A:
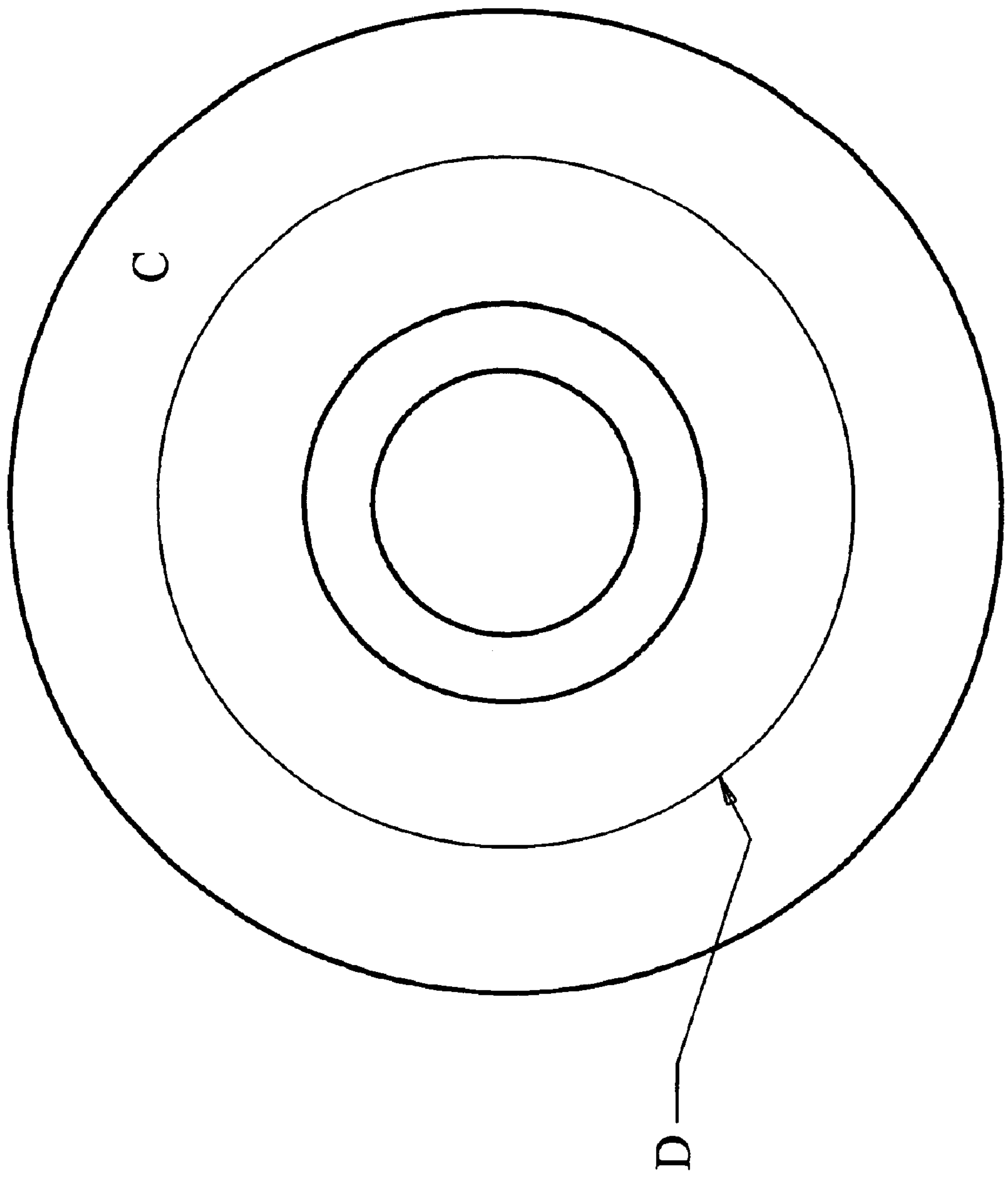
FIGS. 4A–4C are to plan views of alternate designs of the work surface C, circular in 4A; ellipsoidal in 4B and clover in 4C.
Figure 5:
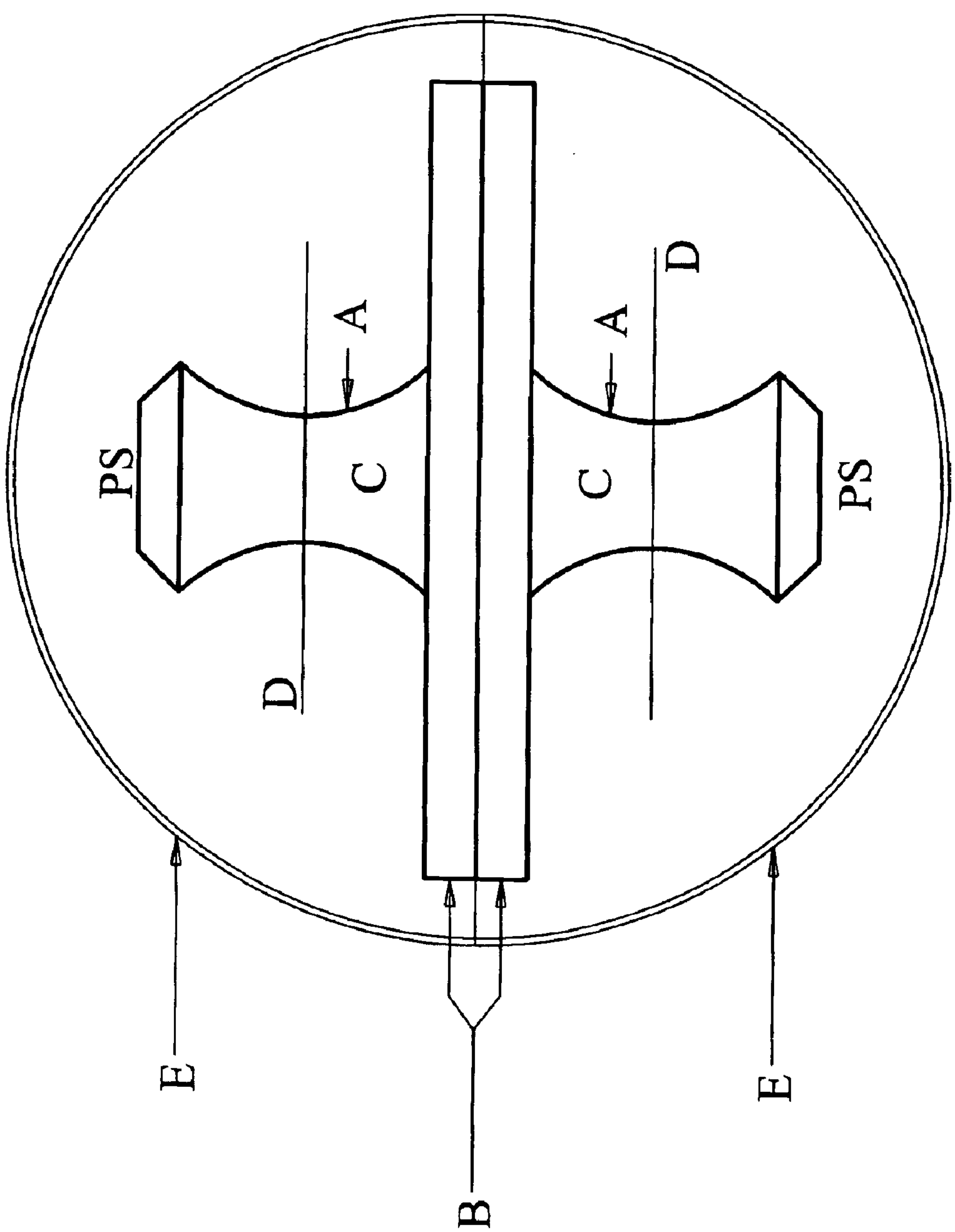
FIGS. 5–5B show pile-ups and/or spatial arrays of the collector/emitter device for reinforcement or performance of several function detailing the work surface C while preserving the angle of the generatrix A and the position of the perimetrical focal line D, FIG. 5 showing a twin configuration united base to base, FIG. 5A showing two versions of a stacked configuration and 5B showing a perspective front view of the collector/emitter device oriented at 120° in a tetrahedral configuration.
Figure 5A:
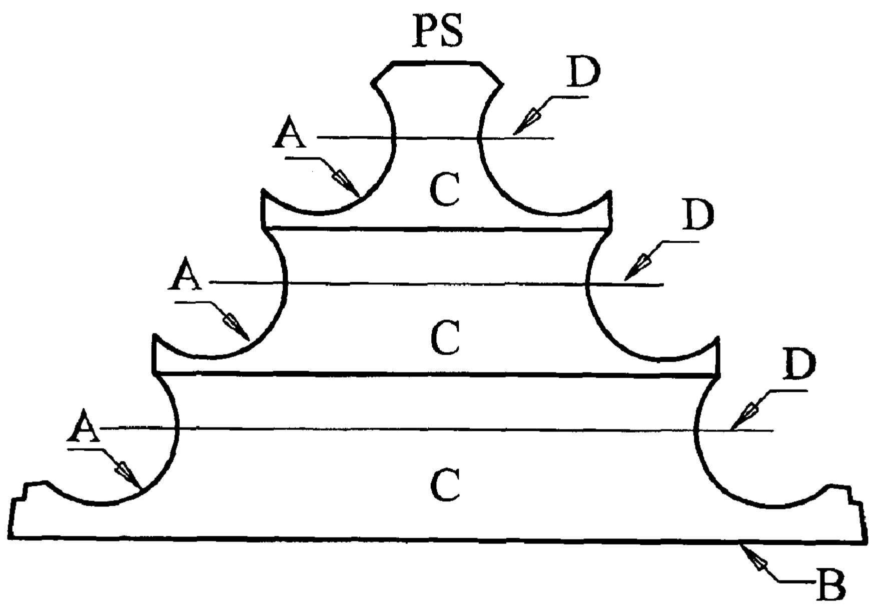
Figure 5A:
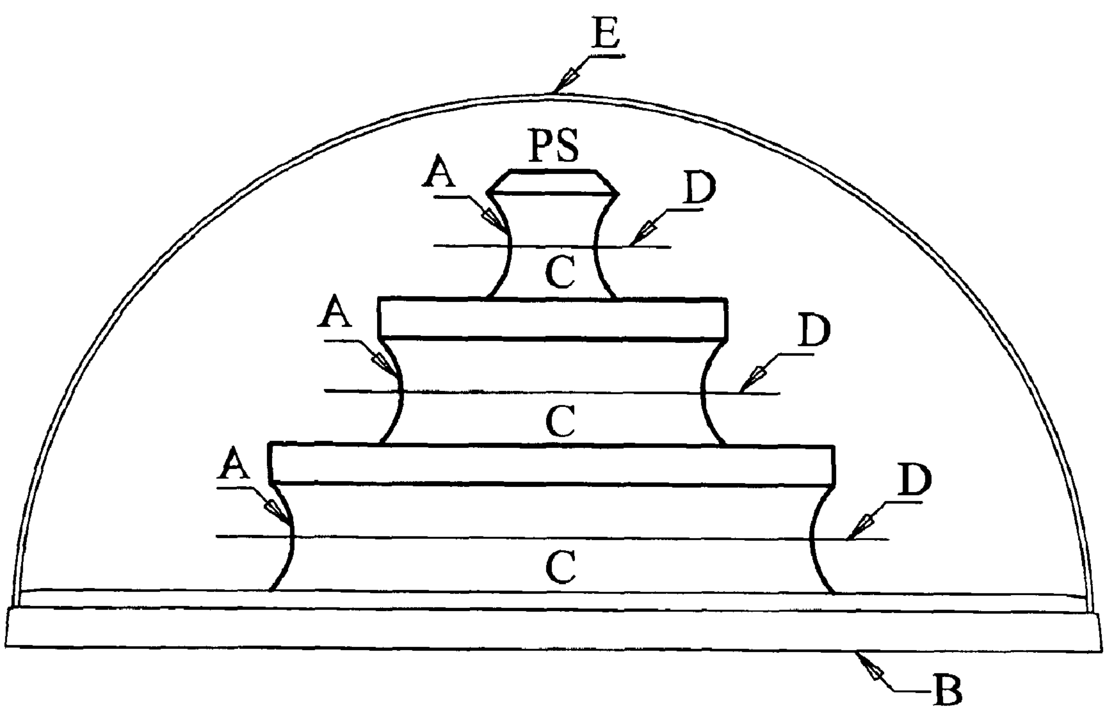
Figure 5B:
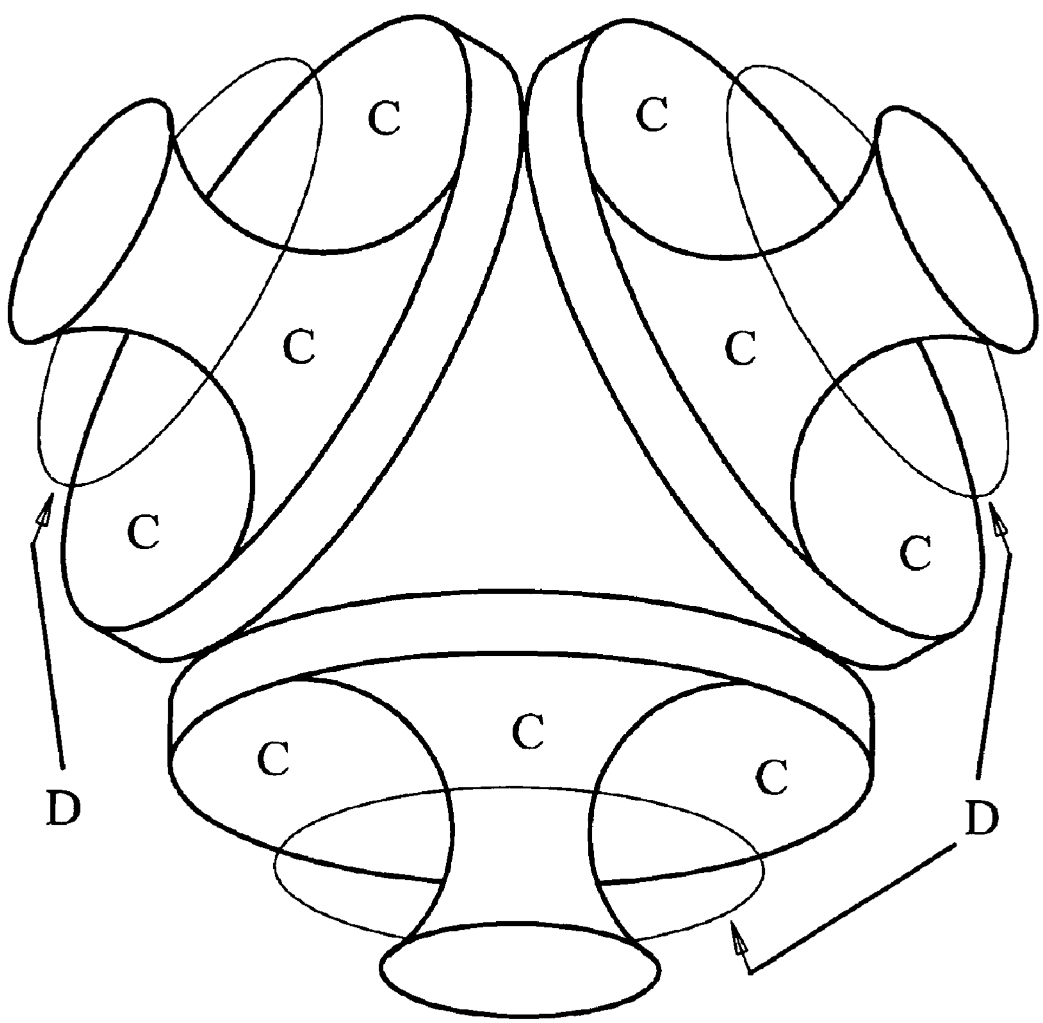

Generatrix A is shown in FIG. 1 as a non-segmented, semicircular or parabolic arc which by means of being rotated around its z-axis on a horizontal plane, generally produces a toroidal body in the shape of a concave semicircular or parabolic frame as shown in FIGS. 2 and 5B. When the concave semicircular or parabolic frame of this toroidal body has a polished reflecting surface, this functions as a collecting and emitting surface referred to herein as the work surface C. The shape of the toroidal body is an important feature of the invention. As shown in FIGS. 1, 4, 6, and 6A, the generatrix A forming the work surface C, is inclined diagonally towards the outside approximately 45°±10, with O as origin and AA denoting a general area where a focal point of concentration situates when radiation is collected and emitted from a work surface shaped as described above. As shown in FIG. 1, the generatrix is an arc formed by taking a circle and dividing this into two equal arcs. One of the arcs is rotated so that the center axis of the arc is approximately 45 degrees from the horizontal to form the generatrix A. The orientation shown in FIG. 1 is a vertical plane with axis coordinates Z and X. The reflecting work surface collects radiation from a source and concentrates the reflected radiations in a focal point of concentration forming a continuous perimetrical line inside a curvature radius defined by the semicircular or parabolic reflecting surface of the toroidal body, the distance of the perimetrical focal line D from the reflecting surface is dependent upon the concavity and orientation or inclination of the reflecting work surface.

FIG. 2 shows schematically where the collection or emission process of solar energy α (or any other kind, according to the use designated for the reflective surface C) occurs. It can be seen that radiations α shown as parallel rays such as those radiating from the sun are collected by surface C, reflected and concentrated in a zone or focal line D, a gerimetrical focal line. Because the concentrating work surface spans the entire 360° and opens obliquely at the described angle of inclination, there is no need to move the work surface as the radiation changes in position with time such as the case of the sun.

Figure 3:
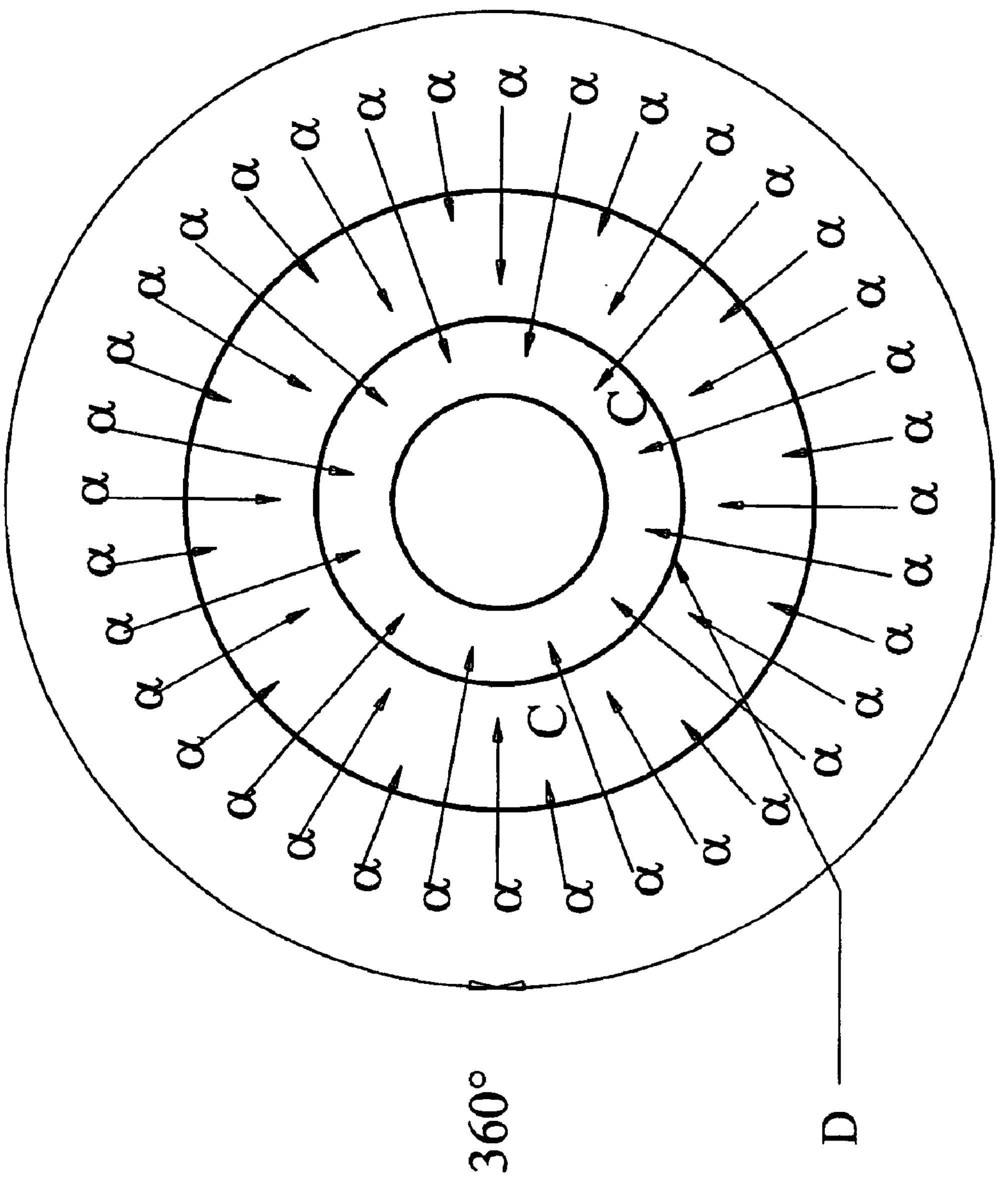
FIG. 3 is a top plan view showing the work surface C collecting the radiation $\alpha$ impinging on the reflective surface of C and emitting on a perimetrical focal line D.

The term focal zone or focal line D, as used here, represents a result of the union of a series of focal points which are placed side by side uninterruptedly, as it is deducted from FIGS. 2, 3, or 4, among others. This series of focal points are the concentrated energy waves around the work surface C which have the same focal distance if there is only one device or it may have more than one focal distance if there are more than one device, for example, when the work surfaces are in a stacked configuration as shown in FIG. 5B.

This means that the work performed by the device of this innovation is equivalent to the ideal array offered by a series of parabola antennae, which focal points are interconnected uninterruptedly among them.

The device under this invention is characterized by fact that the working surface has an action area of 360° from the horizontal; and as it is shown on FIG. 2 and 3, the action area is 180° from the vertical, without the need of any movement of its constituent parts.

As can be seen on FIG. 4, the shape of the toroidal body of the collector/emitter of this invention, work surface C, is obtained by moving the generatrix A positively on x-axis, and then revolving it 360° from the z-axis. In the collector/emitter device, the work surface C can be an independent body because of its double curvature configuration. The work surface C, however, can have a base B and a flat top surface PS as shown in FIGS. 5, 5A, 6 and 6A if the use of the working surface C can be aided by these parts which is usually dictated by the modality of the chosen device.

The body or frame of the work surface C, can be built of almost any kind of material, as long as it complies with the requirements of stability and strength, according to the use it will be given. For example, it can be built from a solid block of hardened aluminum or some other ferric or non-ferric metal covered with or without a plastic material, stabilized against the effects of light, heat or oxygen; and it can also be built of plastic or wood. The function does not rest upon the make up of the parts of the body as long as the reflecting surface of its work surface C provides the characteristic of emission or reception, or both as required.

It will be obvious to those people with an intermediate knowledge of the subject, that the role the main work surface plays is fundamental, while the construction of the device itself is only important as an economical and mechanical matter.

The materials useful for the construction of the reflective surface of the work surface C include polished, looking-glass grade metals, or materials lapped, i.e. highly polished, either by deposit or lamination. It is preferable for the surface to be highly reflective.

In a preferred design, the work surface is composed of a reflective aluminum surface covered either by a polymer material stabilized against ultraviolet light or with some other chemical or electrochemical treatment that allows it to keep its reflective properties regardless the surrounding environment.

Figure 4B:
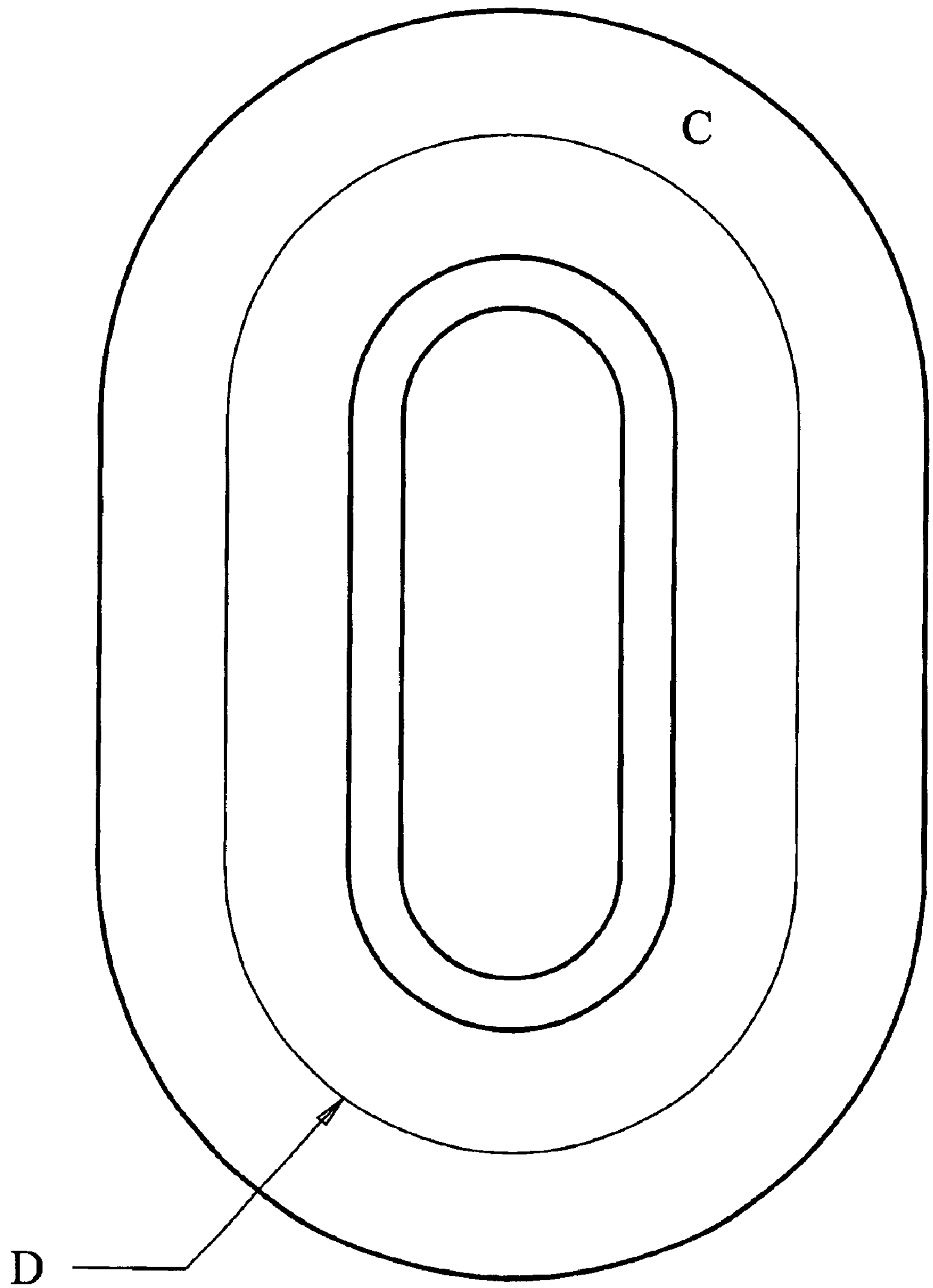
Figure 4C:
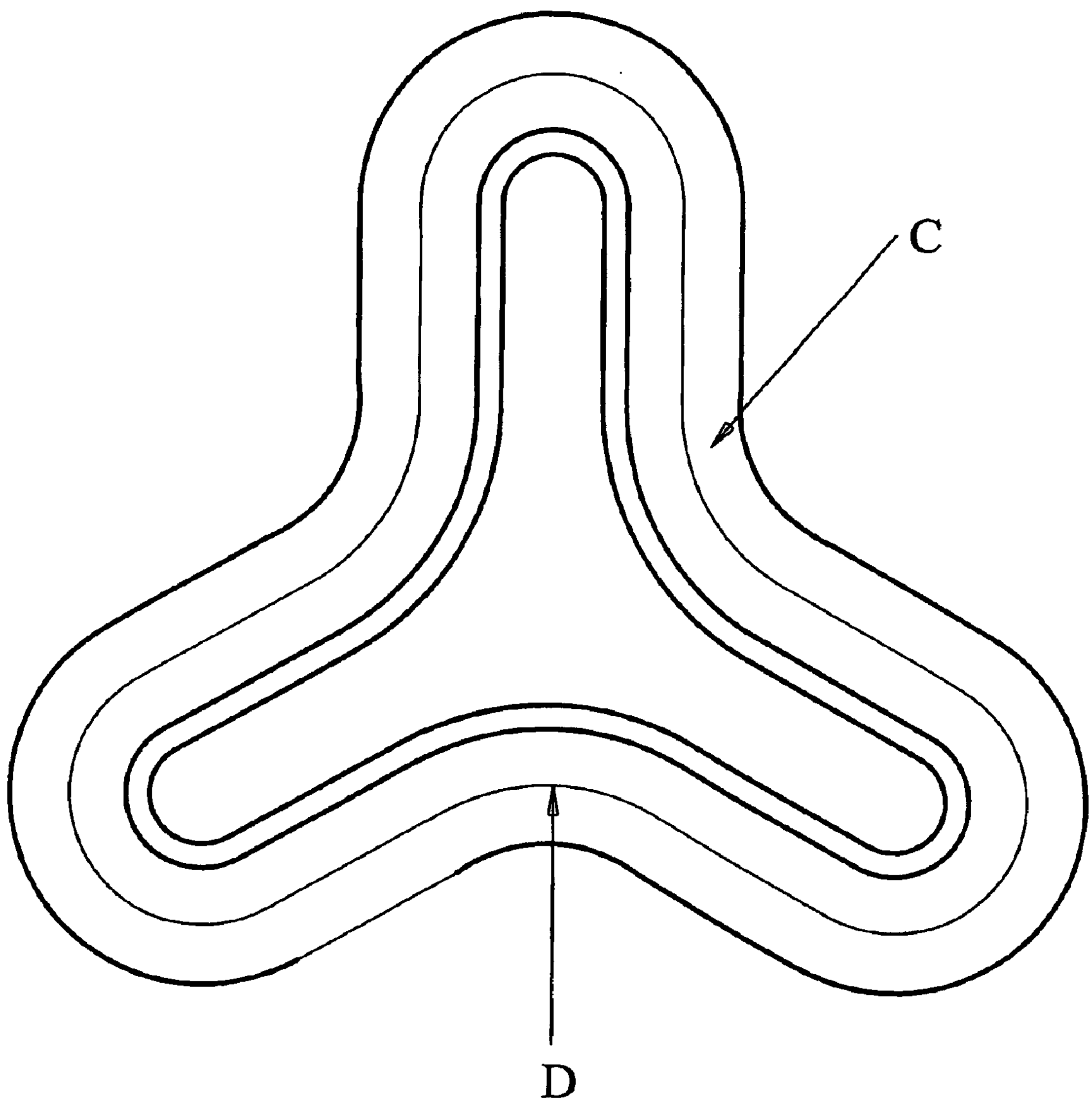
Figure 4D:
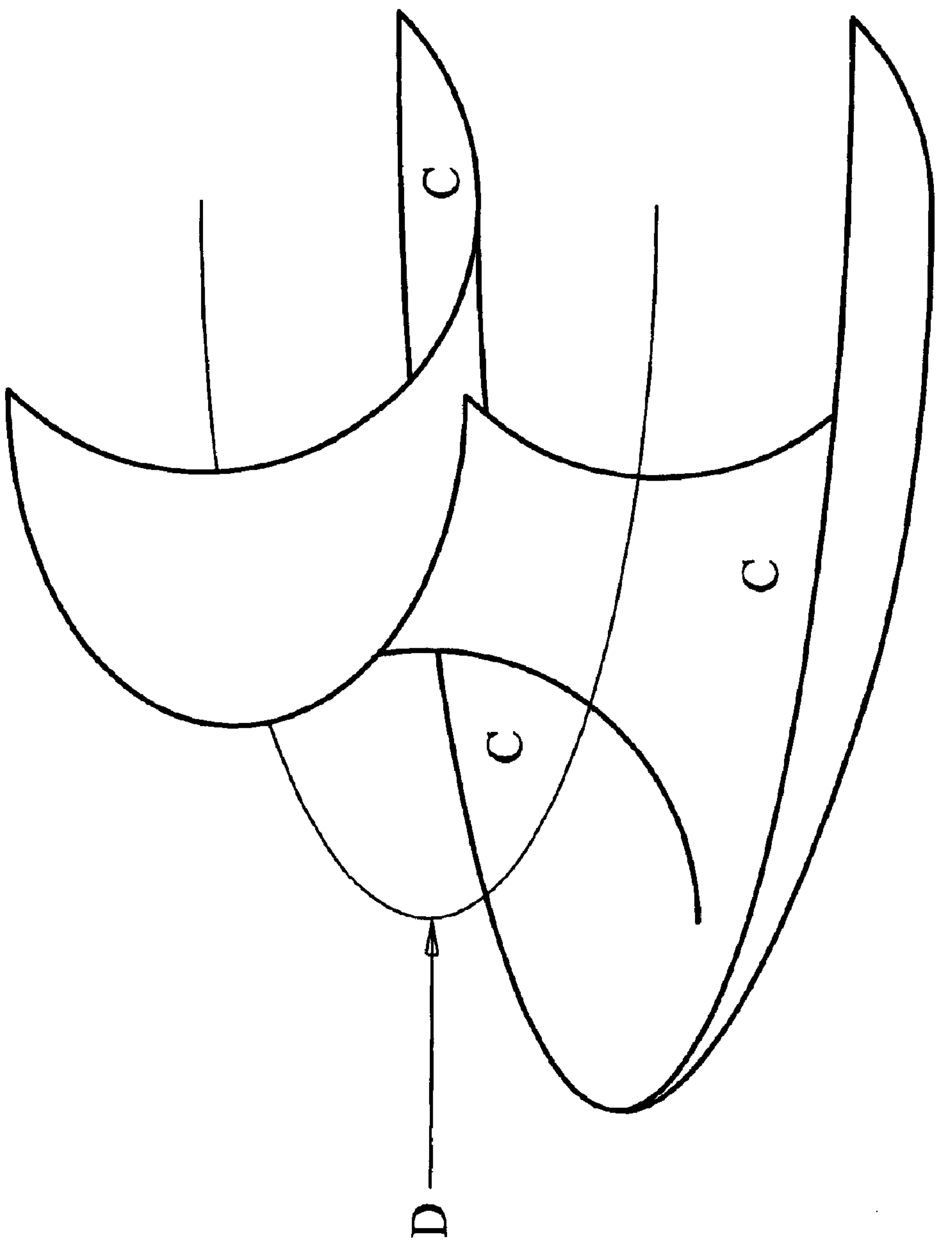
FIG. 4D is a frontal perspective view of the collector/emitter device of this invention in a spiral configuration showing the position of the perimetrical focal line D.

As demonstrated by FIGS. 4B to 4D, the device's profile can be extruded regarding one or more Cartesian axis, depending on the use intended for the device; for example, it could be placed on top of a bus, adopting the form in 4B, or on top of a building with a configuration similar to the one on FIG. 4C, or be moved along the vertical, or related to two or three axis, x, y, z, as on FIG. 4D.

Figure 4E:
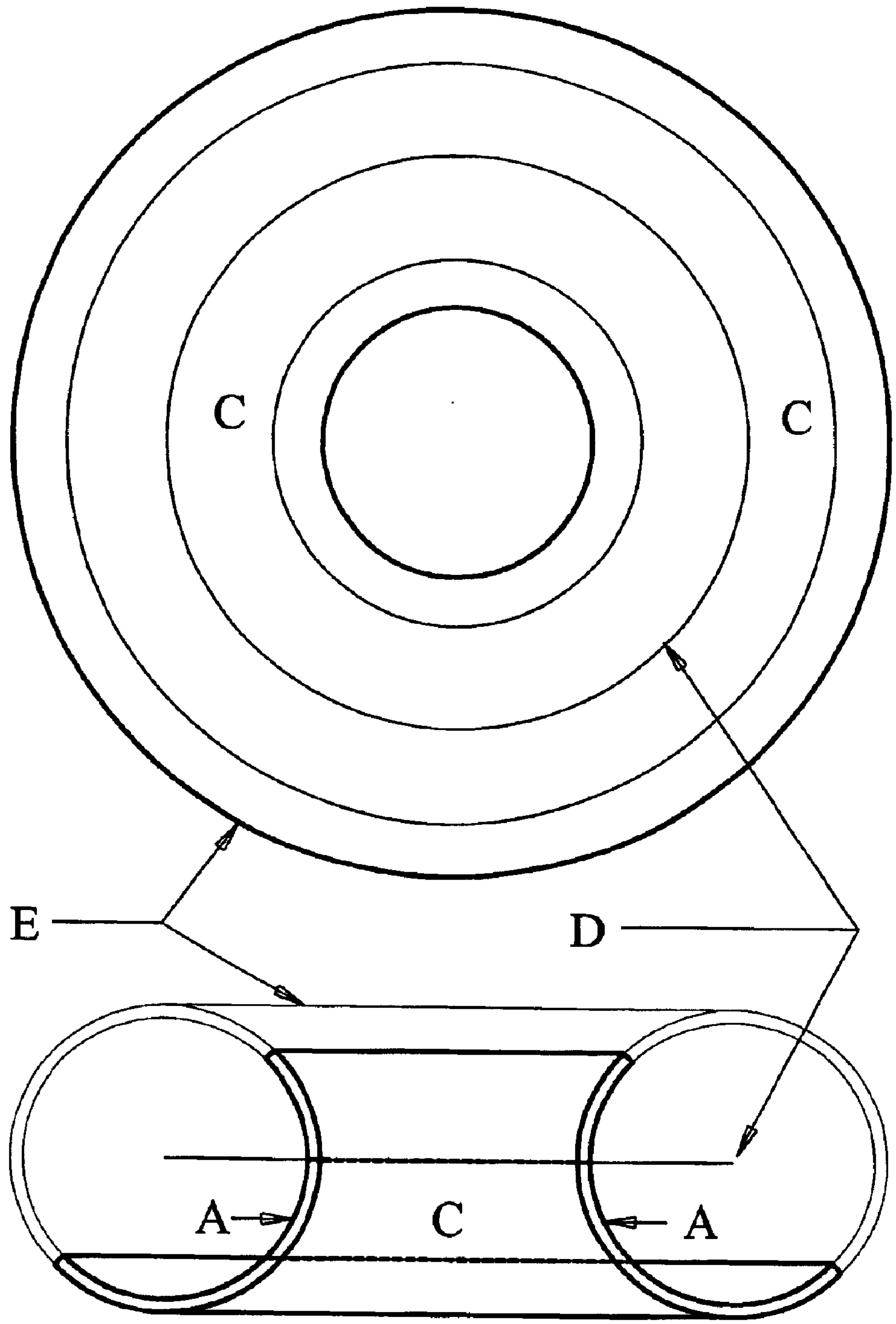
FIG. 4E is a top plan view and transversal cut of the collector/emitter in a circular configuration detailing the work surface C formed from generatrix A and the position of the perimetrical focal line D having in this illustration, an envelope E as a continuation of the working surface C and covering the work surface, resulting in an integrated device.

FIG. 4E shows a design of the apparatus in this invention, where an envelope E or bell can be seen, which is used for several purposes. One of them is to use it as filter for certain kind of radiations, avoiding the ultraviolet rays, for example, from touching the reflective surface, or allowing only one wavelength to pass through. Another use is to isolate the collector/emitter device from the environmental conditions.

FIG. 4 shows a transversal cut of the device showing the reflecting surface generated by rotating the generatrix A shown in FIG. 1. FIG. 5B shows a perspective view of the device, however, in this illustration, three of these devices are in spatial array. As shown, the frame or body of the device gradually constricts at a central portion and thereafter expands gradually towards its base B. Opposite the base is a round flat surface PS. This design, having a constricted central portion, supports the curvature of the reflecting surface of the toroidal work surface C located between PS and B. As stated earlier, the reflecting and consequently, the collecting surface may be formed from a solid metal material forming the device by polishing the curvature portion of the solid metal to a high reflection specification while retaining the diagonal orientation and shape of the generatnx A or the reflecting surface can be lapped either by deposition or lamination on the concave semicircular or parabolic frame of the toroidal work surface C having the desired diagonal orientation and shape of the generatrix A. FIG. 5B shows a series of devices, the collector/emitter device of this invention, in a stacked configuration. The top device has a work surface C of a reduced curvature radius compared to the devices underneath which progressively increases in curvature radius. In all the different embodiments or design of the device herein, the principal element of the claimed invention is the retention of the orientation and shape of the semicircular or parabolic reflecting work surface C generated by the generatrix A shown in FIG. 1.

The bell is made of a totally transparent material, or a material which exterior surface is transparent to the radiations that will be worked with, but its inner surface is reflective to those same radiations. Obviously, this construction depends upon the use intended for the collector/emitter.

As explained below, the fundamental purpose of this envelope is to increase the efficiency of the collector/emitter device because it can prevent the escape of heat and/or reflected light from the system.

Similarly, the device on FIG. 4 can be assembled to form an apparatus that contains two or more of them, and perform adaptations among them to obtain the spatial dispositions shown on FIGS. 5–5B. In all of them we find the common characteristic of the profile generated by the revolution of generatrix A, except that the revolution is made in more than one direction or Cartesian axis.

It will be evident for a person with intermediate knowledge of this subject that the different configurations will be useful in different applications, and that different configurations can be inferred from the reading of this invention, without they being apart from the essence of same.

Figure 6:
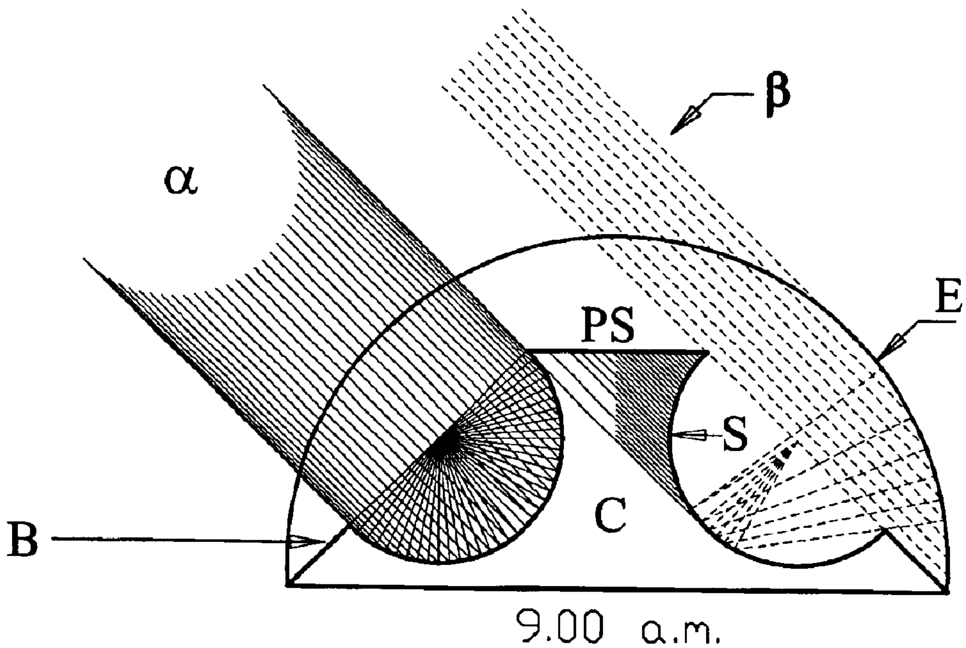
FIG. 6 is a schematic representation of the collector/emitter device collecting a solar radiation at 9:00 A.M. having an envelope or bell E collecting β radiations that do not impinge directly on the work surface C.
Figure 6:
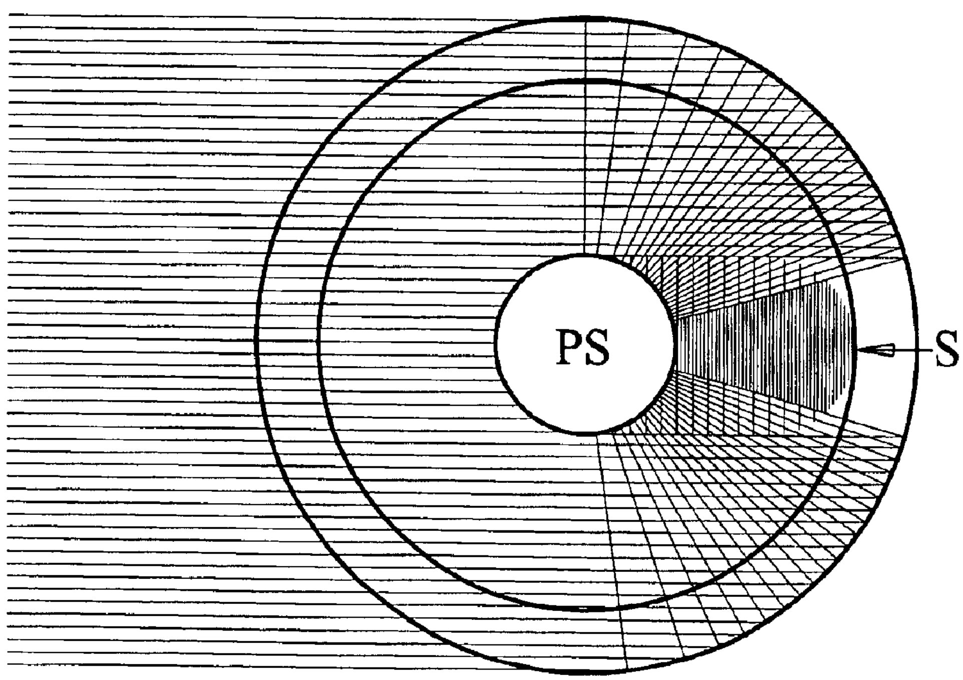
Figure 6A:
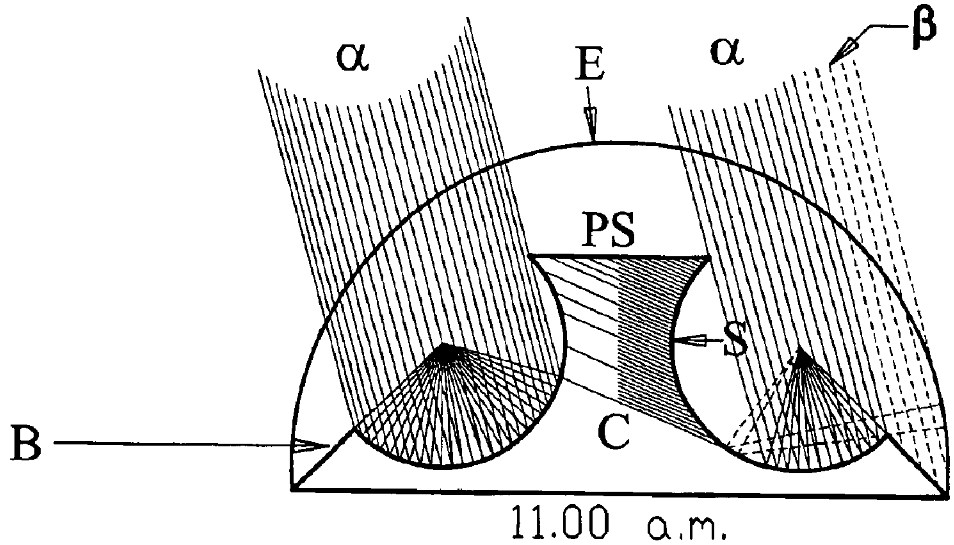
FIG. 6A is a schematic representation of the collector/emitter device collecting a solar radiation at 11:00 A.M. having the same envelope or bell E collecting β radiations that do not impinge directly on the work surface C.
Figure 6A:
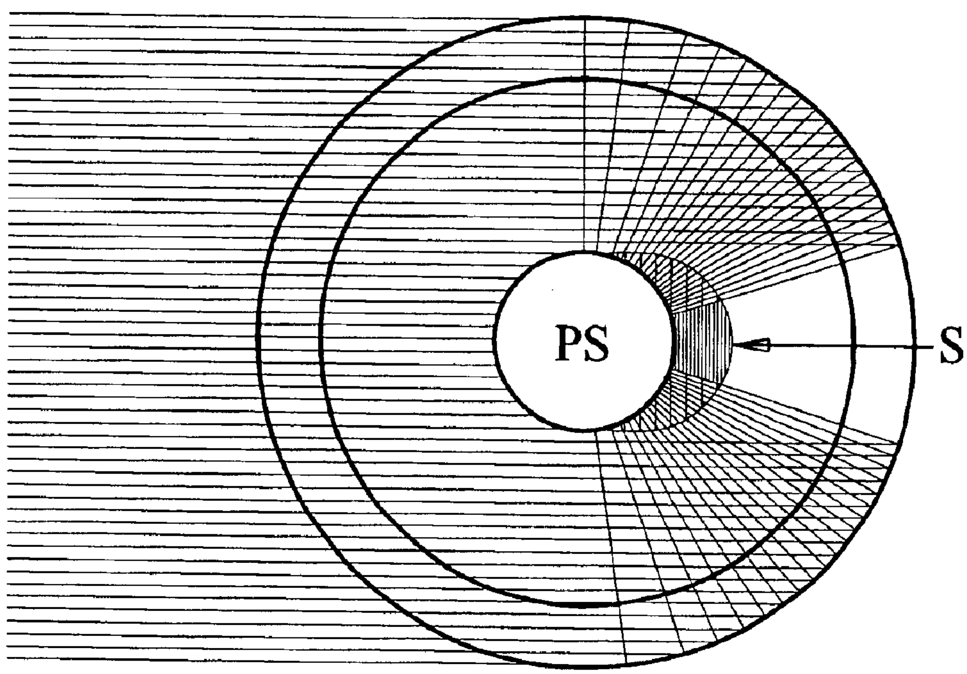

FIGS. 6 and 6A show how lines β that represent radiations that do not impinge directly on the reflective work surface C, different from α, are collected by the bell or envelope E, which due to its configuration tends to concentrate them in one focal point, crashing with work surface C, producing a feedback and reducing the shadow S produced by the collector/emitter device, thus increasing importantly the radiation collection effectiveness. The shape and material of the envelope is tailored to the anticipated use of the device.

FIG. 6 shows the work performed by bell E at 9:00 A.M. versus that performed at 11:00 A.M. shown in FIG. 6A.

Some of the applications that the collector/emitter device of this invention may have are the collection and concentration of solar energy, with the purpose of heating up several fluids at industrial and domestic level, in order to, for example, provide heat or electricity within an enclosure by adapting the adequate components already in use in industry; general lighting through the use of fiberoptics; pick-up or broadcast of radio or television waves, within and outside the earth's atmosphere, collection or emission of electromagnetic waves within and outside the earth's atmosphere as a mean of collecting solar energy and send it to elements that transform it into electrical power to drive vehicles, motors, etc.

An important feature to observe in this invention is the inclination of the generatrix in regards to the vertical or horizontal axis, which is 45°±10° and which purpose is to present the largest surface facing the radiation source.

As can be seen in the attached figures, the device also contains a base B and a top piece PS that are used both to settle the device on a surface and to attach it to another device, besides, the accessories of this device can be introduced or removed through these elements, for example, piping or wires to conduct fluids or energy. The bell E can be similarly attached to the top piece PS or to the base B by means of any suitable items, such as screws, bolts, glue, staples, locks, etc. The building material of the base and the top piece can either be the same or different from the one of work surface C. Similarly, the device's body can be hollow or solid, depending on the use and building materials.

The energy concentrated in the focal line D is thereafter available for use by placing a device upon focal line D which translate or transfer the energy to the different locations of the point of use. These devices that attach or communicate with the claimed device are designed and chosen according to the contemplated usage.

What is claimed is:

1. A a radiation collector/emitter device, comprising:

a stationary toroidal work surface having a rotation axis and including a a polished concave semicircular or parabolic reflecting surface, said concave reflective surface being generated by rotating a generatrix full 360 degrees about said rotation axis on a horizontal plane, the generatrix having an inclined axis and being one of a semicircular arc centered about said inclined axis or a parabolic arc having parabolic arc sections on both sides of said inclined axis, said inclined axis being inclined diagonally outward of said rotation axis and oriented approximately 45 degrees with respect to the horizontal plane, the reflecting surface collecting radiation from a source and concentrating the reflected radiations in a focal perimetrical line inside a curvature radius defined by the concave reflecting surface, and the distance of the perimetrical line from the concave reflecting surface being dependent upon the concavity and orientation or inclination of the reflecting surface.

2. The device of claim 1 wherein the toroidal work surface is circular in shape, or further formed into an ellipsoidal, spiral or clover shape, each shape preserving the orientation and arcuate form of the concave semicircular or parabolic reflecting surface.

3. A radiation collector/emitter device comprising a plurality of collector/emitter devices according to claim 1, piled on top of each other, each device preserving the outward diagonal inclination of the generatrix forming said toroidal work surface.

4. A radiation collector emitter device comprising a plurality of collector/emitter devices according to claim 1, arranged in spatial arrays, each device preserving the outward diagonal inclination of the generatrix forming the toroidal work surface.

5. The device of claim 1 wherein the material for the work surface is stable and strong.

6. The device of claim 1 wherein the polished reflecting surface is made from a solid block of material selected from the group consisting of hardened aluminum, ferric metal and non-ferric metal.

7. The device of claim 6 wherein the solid block of material is aluminum covered by a polymer material stabilized against ultraviolet light.

8. The device of claim 6 wherein the polished reflecting surface is a solid block of aluminum covered by a chemical or treated electrochemically to keep its reflective property.

9. The device of claim 1 wherein the work surface is made of a highly reflective metal.

10. The device of claims 1 wherein the reflecting work surface is made of a highly polished metal resulting from deposition or lamination on the concave semicircular or parabolic surface.

11. The device of claim 1 further comprising a base and a top piece for settling the device on a surface or attaching the device to another device.

12. The device of claim 1 wherein the degree of inclination is 45 ±10 ° from the horizontal plane.

13. The device of claim 1 further comprising an envelope for collecting radiation not impinging directly on the work surface.

14. The device of claim 13 wherein the envelope attaches to a base or a top piece of the work surface.

15. The device of claim 13 wherein the envelope is a continuation of the work surface.

16. The device of claim 13 wherein the envelope is made of totally transparent material.

17. The device of claim 13 wherein the envelope is made of a material having an exterior surface transparent to radiation and an inner surface reflective to radiation.

* * * * *